US012057668B2

(12) United States Patent
Lin et al.

(10) Patent No.: US 12,057,668 B2
(45) Date of Patent: Aug. 6, 2024

(54) ADAPTER

(71) Applicant: Dongguan Wontravel Electric Co., Ltd., Guangdong (CN)

(72) Inventors: Liangguan Lin, Guangdong (CN); Xiaolong Li, Guangdong (CN); Yingde Pan, Guangdong (CN)

( * ) Notice: Subject to any disclaimer, the term of this patent is extended or adjusted under 35 U.S.C. 154(b) by 287 days.

(21) Appl. No.: 17/630,549

(22) PCT Filed: Mar. 30, 2020

(86) PCT No.: PCT/CN2020/082063
§ 371 (c)(1),
(2) Date: Jan. 27, 2022

(87) PCT Pub. No.: WO2021/017505
PCT Pub. Date: Feb. 4, 2021

(65) Prior Publication Data

US 2022/0255275 A1 Aug. 11, 2022

(30) Foreign Application Priority Data

Jul. 31, 2019 (CN) ......................... 201910701511.9

(51) Int. Cl.

| | |
|---|---|
| ***H01R 31/06*** | (2006.01) |
| ***H01R 13/629*** | (2006.01) |
| ***H01R 13/66*** | (2006.01) |
| ***H01R 13/68*** | (2011.01) |
| ***H01R 24/68*** | (2011.01) |

(52) U.S. Cl.
CPC ......... *H01R 31/065* (2013.01); *H01R 13/629* (2013.01); *H01R 13/665* (2013.01); *H01R 13/68* (2013.01); *H01R 24/68* (2013.01)

(58) Field of Classification Search
CPC .. H01R 31/065; H01R 13/629; H01R 13/665; H01R 13/68; H01R 24/68; H01R 13/6675; H01R 27/00; H01R 13/40; H01R 13/4534; H01R 13/502; H01R 13/60; H01R 13/688
See application file for complete search history.

(56) References Cited

U.S. PATENT DOCUMENTS 10,686,285 B2 * 6/2020 Cai ...................... H01R 13/631

FOREIGN PATENT DOCUMENTS

| | | | |
|---|---|---|---|
| CN | 105261908 A * | 1/2016 | |
| CN | 110875560 B * | 11/2021 | ........... H01R 13/502 |
| WO | WO-2013155759 A1 * | 10/2013 | ............. H01R 31/06 |

* cited by examiner

*Primary Examiner* — Travis S Chambers

(57) ABSTRACT

The present invention provides a plug converter which comprises a housing, a support assembly, a circuit board and at least two pin assemblies wherein the pin assemblies are arranged layer by layer in sequence, and the support assembly comprises a first support frame used for installing a live-wire connecting sheet and a null-wire connecting sheet and a second support frame used for installing the pin assemblies; the first support frame and the circuit board are arranged at the top and the bottom of the second support frame respectively.

13 Claims, 8 Drawing Sheets

ADAPTER

BACKGROUND OF THE INVENTION

The present invention relates to the technical field of an electrical plug, in particular relates to a plug converter.

In real life, the plugs of electronic products are designed differently and the design standards of different countries are different; therefore, the plugs of electrical appliances bought in different countries cannot be plugged conveniently into the power socket, resulting in the problem that mobile phones or other electronic devices cannot be charged and thus resulting in great trouble to people's life; especially when traveling, such problem is in particular obvious; therefore, it is particularly necessary to carry a plug converter.

However, when the plugs of different types are placed in the housing of a plug converter in the prior art, the plugs of different types occupy much space in the housing so that the part utilization rate inside the housing and the space utilization rate of the housing cannot be improved.

BRIEF SUMMARY OF THE INVENTION

Based on this, the purpose of the present invention is to provide a plug converter to solve the problem in the prior art that a plug converter takes on a low internal part utilization rate and its housing takes on a low internal space utilization rate.

As a technical solution of the present invention: a plug converter comprises a housing, a support assembly, a circuit board and at least two pin assemblies wherein the pin assemblies are arranged layer by layer in sequence, and the support assembly comprises a first support frame used for installing a live-wire connecting sheet and a null-wire connecting sheet and a second support frame used for installing the pin assemblies; the first support frame and the circuit board are arranged at the top and the bottom of the second support frame respectively; the housing is connected with a plurality of propelling devices; the second support frame is connected with a plurality of guide devices corresponding to the pin assemblies one to one; the pin assemblies are connected with the corresponding guide devices in a slidable manner; the live-wire connecting sheet, the null-wire connecting sheet and the pin assemblies are electrically connected with the circuit board; the top of the housing is provided with a plurality of jacks at the positions corresponding to the live-wire connecting sheet and the null-wire connecting sheet, and the bottom of the housing is provided with a plurality of jacks at the positions corresponding to the pin assemblies;

the propelling devices can drive the corresponding pin assemblies to move between the active position and the inactive position; when a pin assembly is at the active position, the pin assembly is connected with an external socket; when a pin assembly is at an inactive position, the pin assembly is located inside the housing.

Optionally, a guide device comprises a guide rod and a guide block wherein the guide rod is fixed onto the second support frame and the guide block is arranged on the outer side of the guide rod and protrudes from the guide rod in the radial direction;

when a pin assembly is at the inactive position, the corresponding propelling device is butted with the end of the corresponding guide block wherein the end is adjacent to the second support frame or butted with the lateral of the corresponding guide block; when a pin assembly is at the active position, the corresponding propelling device is butted with the end of the corresponding guide block far away from the second support frame.

Optionally, the plug converter comprises a first pin assembly, a second pin assembly, a first propelling device and a second propelling device wherein the first pin assembly is connected with the corresponding guide device in a slidable manner and the first propelling device is arranged at the upper end of the first pin assembly;

the second pin assembly is connected with the corresponding guide device in a slidable manner and the second propelling device is arranged at the upper end of the second pin assembly.

Optionally, the first pin assembly comprises a first base and two first pins symmetrically arranged relative to the center of the first base wherein the two first pins are arranged at the bottom of the first base and the first base is provided with first slide grooves which allow the corresponding guide devices to pass through;

a first propelling device comprises a first propelling rod, a first pushing piece and two first limit blocks symmetrically arranged on both sides of the first propelling rod wherein the first base is provided with two first protruding blocks corresponding to the first limit blocks, the first propelling rod is connected with the first base in a slidable manner, the first push rod is provided with a second slide groove which allows the corresponding guide device to pass through, the first pushing piece is arranged on the lateral of the first propelling rod and protrudes from the outer surface of the housing, the housing is provided with a first guide groove which allows the first pushing piece to slide and the width of the first pushing piece is greater than the width of the first guide groove.

Optionally, the second pin assembly comprises a second base, two second pins symmetrically arranged relative to the center of the second base and a third pin arranged at the bottom of the housing wherein the second pins are arranged at the bottom of the second base, the third pin is rotatably connected with the bottom of the housing and the bottom of the second base is provided with a push rod which drives the third pin to rotate and the second base is provided with a third slide groove which allows the corresponding guide device to pass through;

the second propelling device comprises a second propelling rod and a second pushing piece wherein the second base is provided with a second protruding block, the second propelling rod is connected with the second base in a slidable manner, the second push rod is provided with a fourth slide groove which allows the corresponding guide device to pass through, the second pushing piece is arranged on the lateral of the second propelling rod and protrudes from the outer surface of the housing, the housing is provided with a second guide groove which allows the second pushing piece to slide and the width of the second pushing piece is greater than the width of the second guide groove.

Optionally, the housing comprises an upper cover and a lower cover which is detachably connected with the upper cover wherein the lower cover is connected with a limit assembly which is used to allow a single pin assembly to protrude from the housing; the limit assembly comprises a gland cover and a second limit block wherein the gland cover is provided with two first apertures which allow the first pins to pass through and two second apertures which allow the second pins to pass through;

the top of the second limit block is provided with a first guide slope arranged corresponding to the bottoms of the first pins and a second guide slope arranged corresponding to the bottoms of the second pins.

Optionally, the third pin is wedged at the bottom of the gland cover and one end of the third pin is connected with the gland cover through the rotation of the rotating shaft;

the gland cover is provided with an aperture which allows the corresponding push rod to pass through and the third pin is located right under the aperture.

Optionally, the second support frame is connected with a plurality of conductive rods corresponding to the pin assemblies wherein the circuit board is electrically connected with the pin assemblies via the corresponding conductive rods.

Optionally, the top of the first support frame is connected with a first safety protection door and two second safety protection doors wherein the two second safety protection doors are symmetrically arranged relative to the first safety protection door, two first resilient elements are connected between the first safety protection door and the inner wall of the housing and two second resilient elements are connected between the second safety protection doors and the first support frame;

the lateral of the first support frame is connected with a third safety protection door wherein a third resilient element is connected between the third safety protection door and the lateral wall of the first support frame.

Optionally, one side of the first safety protection door is provided with a third guide slope, the other side of the first safety protection door is provided with two fourth guide slopes symmetrically arranged relative to the first guide slope and the two fourth guide slopes are located right above the live-wire connecting sheet and the null-wire connecting sheet respectively;

the second safety protection doors are provided with two fifth guide slopes wherein the fifth guide slopes are arranged opposite to the second resilient element and the fifth guide slopes are located right above the live-wire connecting sheet or the null-wire connecting sheet;

the third safety protection door is provided with two sixth guide slopes wherein the two sixth guide slopes are arranged corresponding to the live-wire connecting sheet and the null-wire connecting sheet respectively.

Optionally, the plug converter also comprises a third pin assembly wherein the third pin assembly comprises a third base, a support housing and two fourth pins symmetrically arranged relative to the center of the third base; the third base is connected with a third pushing piece and the third pushing piece is arranged on the outer side of the housing, the two fourth pins are arranged at the bottom of the third base and the outer side of the housing is provided with a third guide groove which allows the third pushing piece to slide;

the support housing is provided with two guide apertures wherein the fourth pins are wedged into the corresponding guide apertures, the support housing is provided with a third slide groove which allows the third base to slide and the height of the third slide groove is smaller than the height of the support housing.

Optionally, the circuit board is provided with a plurality of USB interfaces wherein two opposite laterals of the housing are provided with a plurality of jacks corresponding to the USB interfaces.

Optionally, the upper cover is provided with a cavity wherein the cavity accommodates a group of fuses and the outside of the cavity is connected with a cover body.

Any embodiment of the present invention has the beneficial effects that:

The plug converter in the present invention is provided with a support assembly comprising a first support frame and a second support frame wherein the first support frame is used for installing the live-wire connecting sheet and the null-wire connecting sheet so that an external plug can be inserted into the live-wire connecting sheet and the null-wire connecting sheet mounted onto the first support frame; the second support frame is connected with a plurality of guide devices, the housing is connected with a plurality of propelling devices and the pin assemblies slide along the guide devices to the outside of the housing under the propelling effect of the propelling devices to realize the connection of the pin assemblies with external sockets; the bottom of the second support frame is connected with a circuit board to realize the electrification of the live-wire connecting sheet, the null-wire connecting sheet and the pin assemblies;

the plug converter in the present invention comprises a support assembly while the circuit board, the pin assemblies, the live-wire connecting sheet and the null-wire connecting sheet of the plug converter are arranged on the support assembly; therefore, the plug converter in the present invention has the advantages of high internal space utilization rate and high internal part utilization rate; therefore, the volume of the plug converter can be smaller so that the plug converter can be carried more conveniently.

DESCRIPTION OF MARKS IN THE ABOVE FIGURES

Figure 1:
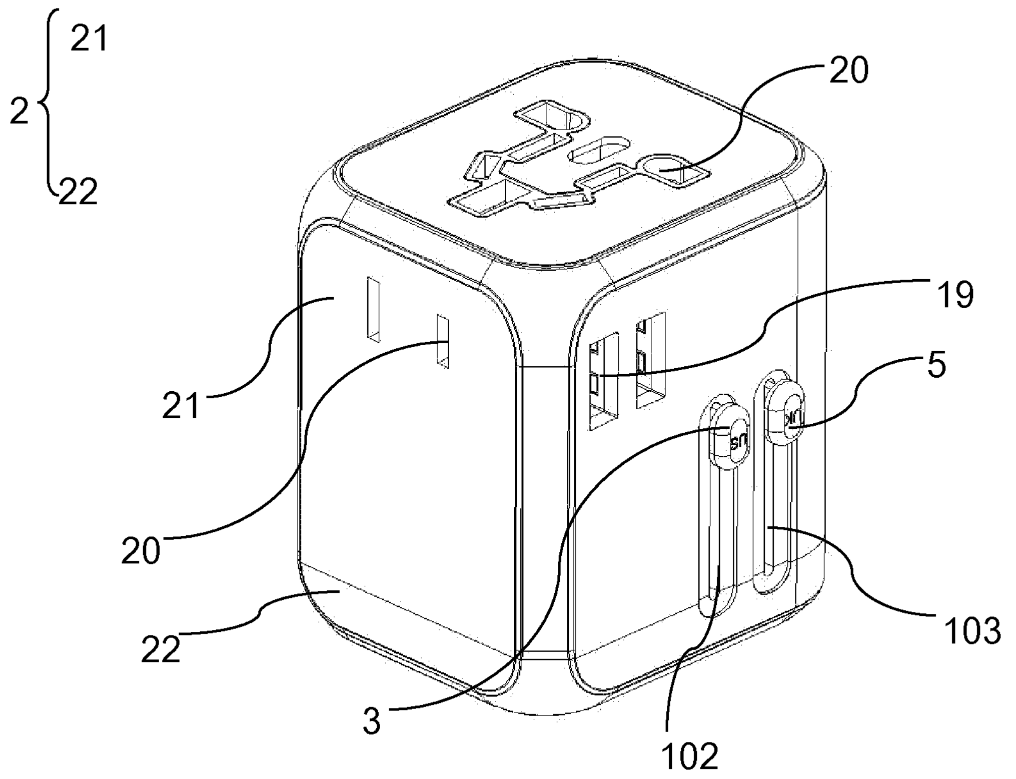
FIG. 1 is the structural view I of the plug converter in the present invention.
Figure 2:
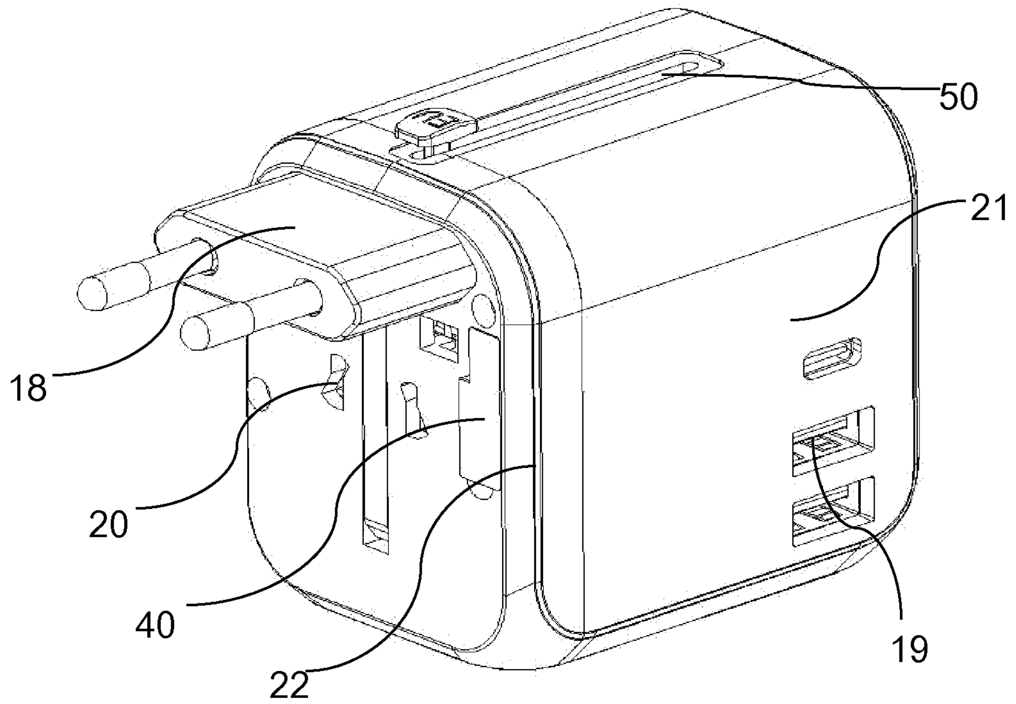
FIG. 2 is the structural view II of the plug converter in the present invention.
Figure 3:
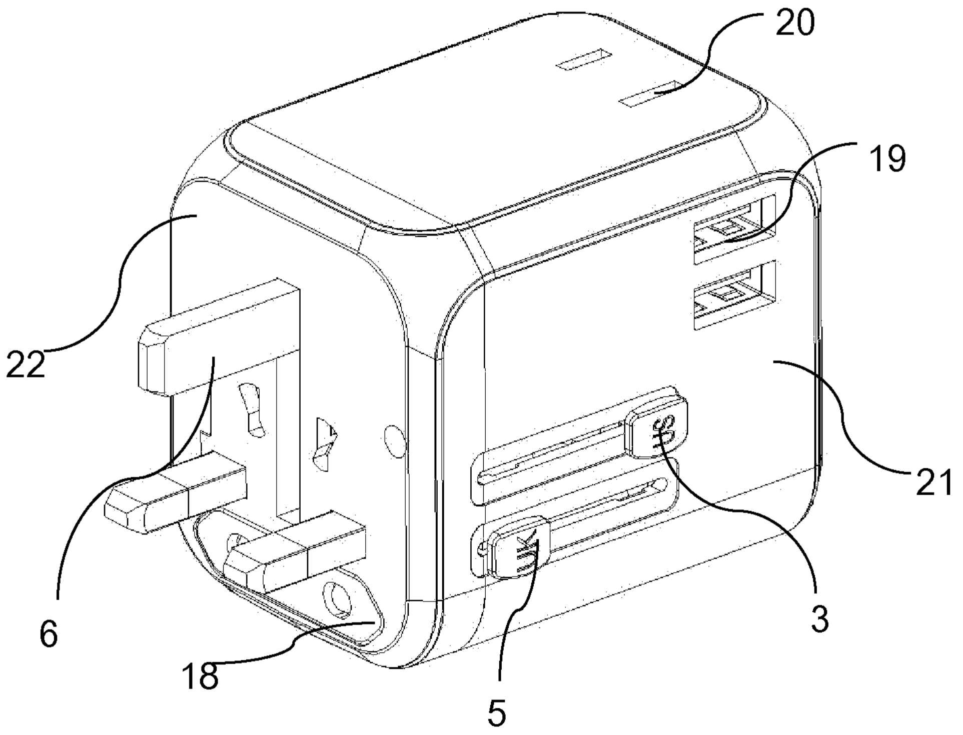
FIG. 3 is the structural view III of the plug converter in the present invention.
Figure 4:
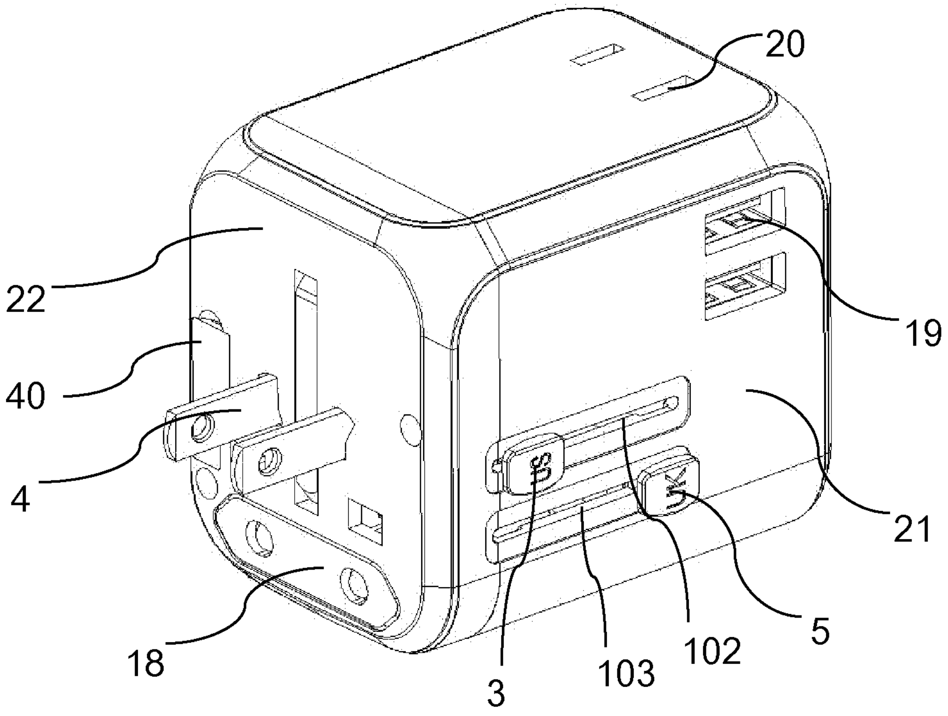
FIG. 4 is the structural view IV of the plug converter in the present invention.

1—circuit board; 2—housing; 21—upper cover; 22—lower cover; 3—first propelling device; 31—first propelling rod; 32—first pushing piece; 33—first limit block; 34—second slide groove; 4—first pin assembly; 41—first base; 42—first pin; 43—first slide groove; 44—first protruding block; 5—second propelling device; 51—second propelling rod; 52—second pushing piece; 53—fourth slide groove; 6—second pin assembly; 61—second base; 62—second pin; 63—third pin; 64—push rod; 65—third slide groove; 66—second protruding block; 7—support assembly; 71 first support frame; 72—second support frame; 8—limit assembly; 81—gland cover; 82—second limit block; 83—first aperture; 84—second aperture; 85—first guide slope; 86—second guide slope; 9—guide device; 91—guide rod; 92—guide block; 10—first safety protection door; 11—second safety protection door; 12—third safety protection door; 13—third guide slope; 14—fourth guide slope; 15—fifth guide slope; 16—live-wire connecting sheet; 17—null-wire connecting sheet; 18—third pin assembly; 181—third base; 182—support housing; 183—fourth pin; 184—third slide groove; 185—third pushing piece; 19—USB interface; 20—jack; 30—fuse; 40—cover body; 50—third guide groove; 60—decorative sheet; 70—first resilient element; 80—second resilient element; 90—third resilient element; 100—conductive rod; 101—sixth guide slope; 102—first guide groove; 103—second guide groove.

DETAILED DESCRIPTION OF THE INVENTION

The technical solutions of the present invention will be described more clearly and fully in conjunction with drawings in the embodiments of the present invention, and obviously, the described embodiments are merely a part of the embodiments of the present invention, not all the embodiments. Based on the embodiments of the present invention, all the other embodiments obtained by the ordinary skilled in the art without creative labors belong to the scope claimed by the present invention.

In the description of the present invention, it should be understood that the directional or positional relationships indicated by the terms "upper", "lower", "left", "right", "top", "bottom" refer to the directional or positional relationships shown in the accompanying drawings, only used for the convenience of describing the present invention and simplifying the description, not used for indicating or implying that the devices or elements concerned must have specific directions, or constructed or operated in specific directions; therefore, such words cannot be understood as a limitation on the present invention.

As shown from FIG. 1 to FIG. 15, an embodiment of the present invention provides a plug converter which comprises a housing (2), a support assembly (7), a circuit board (1) and at least two pin assemblies based on different standards wherein the pin assemblies are arranged layer by layer in sequence, and the support assembly (7) comprises a first support frame (71) used for installing a live-wire connecting sheet (16) and a null-wire connecting sheet (17) and a second support frame (72) used for installing the pin assemblies based on different standards; the first support frame (71) and the circuit board (1) are arranged at the top and the bottom of the second support frame (72) respectively; the housing (2) is connected with a plurality of pin assembly propelling devices; the second support frame (72) is connected with a plurality of guide devices (9) corresponding to the pin assemblies one to one; the pin assemblies are connected with the corresponding guide devices (9) in a slidable manner; the live-wire connecting sheet (16), the null-wire connecting sheet (17) and the pin assemblies are electrically connected with the circuit board (1); the top of the housing (2) is provided with a plurality of jacks (20) at the positions corresponding to the live-wire connecting sheet (16) and the null-wire connecting sheet (17); and the bottom of the housing (2) is provided with a plurality of jacks (20) at the positions corresponding to the pin assemblies.

The propelling devices can drive the corresponding pin assemblies to move between the active position and the inactive position; when a pin assembly is at the active position, the pin assembly is connected with an external socket; when a pin assembly is at the inactive position, the pin assembly is located inside the housing.

Based on the above design, the plug converter in the present invention is provided with a support assembly (7) comprising a first support frame (71) and a second support frame (72) wherein the first support frame (71) is used for installing the live-wire connecting sheet (16) and the null-wire connecting sheet (17) so that an external plug can be inserted into the live-wire connecting sheet (16) and the null-wire connecting sheet (17) mounted onto the first support frame (71); the second support frame (72) is connected with a plurality of guide devices (9), the housing (2) is connected with a plurality of propelling devices and the pin assemblies slide along the guide devices (9) to the outside of the housing (2) under the propelling effect of the propelling devices to realize the connection of the pin assemblies with external sockets; the bottom of the second support frame (72) is connected with a circuit board (1) to realize the electrification of the live-wire connecting sheet (16), the null-wire connecting sheet (17) and the pin assemblies;

the plug converter in the present invention comprises a support assembly (7) while the circuit board (1), the pin assemblies, the live-wire connecting sheet (16) and the null-wire connecting sheet (17) of the plug converter are arranged on the support assembly (7); therefore, the plug converter in the present invention has the advantages of high internal space utilization rate and high internal part utilization rate; therefore, the volume of the plug converter can be smaller so that the plug converter can be carried more conveniently.

In this embodiment, as shown from FIG. 1 to FIG. 7, in order to facilitate the movement of the pin assemblies along the guide devices (9), a guide device (9) comprises a guide rod (91) and a guide block (92) wherein the guide rod (91) is fixed onto the second support frame (72), and the guide block (92) is arranged on the outer side of the guide rod (91) and protrudes from the guide rod (91) in the radial direction;

when a pin assembly is at the inactive position, the corresponding propelling device is butted with the end of the corresponding guide block (92) wherein the end is adjacent to the second support frame (72) or butted with the lateral of the corresponding guide block (92); when a pin assembly is at the active position, the corresponding propelling device is butted with the end of the corresponding guide block (92) far away from the second support frame (72). Specifically, the guide blocks (92) play a role in positioning and guiding the movement of the corresponding pin assemblies wherein the specific working process is as follows:

The propelling devices can push the pin assemblies to move up and down; therefore, when a propelling device is butted with the end of the corresponding guide block (92) wherein the end is adjacent to the second support frame (72) and the corresponding pin assembly is fully located inside the housing (2) so that the pin assembly is placed inside the housing (2); when a propelling device is butted with the lateral of the corresponding guide block (92), the corresponding pin assembly moves up or down; when a propelling device is butted with the end of the corresponding guide block (92) far away from the second support frame (72), the corresponding pin assembly is fully located outside the housing (2) so that the pin assembly can be inserted into an external socket.

In this embodiment, as shown from FIG. 1 to FIG. 13, the plug converter in the present invention comprises a first pin assembly (4), a second pin assembly (6), a first propelling device (3) and a second propelling device (5) wherein the first pin assembly (4) is connected with the corresponding guide device (9) in a slidable manner and the first propelling device (3) is arranged at the upper end of the first pin assembly (4);

the second pin assembly (6) is connected with the corresponding guide device (9) in a slidable manner and the second propelling device (5) is arranged at the upper end of the second pin assembly (5); in an embodiment of the present invention, the first pin assembly (4) is an American pin assembly and the second pin assembly (6) so that the plug converter in the present invention can be applicable to the plug standards of multiple countries and thus possesses excellent compatibility.

In this embodiment, as shown from FIG. 1 to FIG. 10, in order to enable the first pin assembly (4) to better slide relative to the corresponding guide device (9), the first pin assembly (4) comprises a first base (41) and two first pins (42) symmetrically arranged relative to the center of the first base (41) wherein the two first pins (42) are arranged at the bottom of the first base (41) and the first base (41) is provided with a first slide groove (43) which allows the corresponding guide device (9) to pass through;

the first propelling device (3) comprises a first propelling rod (31), a first pushing piece (32) and two first limit blocks (33) symmetrically arranged on both sides of the first propelling rod (31) wherein the first base (41) is provided with two first protruding blocks (44) corresponding to the first limit blocks (33), the first propelling rod (31) is connected with the first base (41) in a slidable manner, the first push rod (64) is provided with a second slide groove (34) which allows the corresponding guide device (9) to pass through, the first pushing piece (32) is arranged on the lateral of the first propelling rod (31) and protrudes from the outer surface of the housing (2), the housing (2) is provided with a first guide groove (102) which allows the first pushing piece (32) to slide and the width of the first pushing piece (32) is greater than the width of the first guide groove (102). Specifically, the first base (41) is arranged for fixing the two first pins (42); the first pushing piece (32) and the first push rod (64) are arranged so that the first pushing piece (32) can pass on the external force applied by the user to the first propelling rod (31) to make the first propelling rod (31) move horizontally and vertically; the first protruding blocks (44) and the first limit blocks (33) are arranged to limit the horizontal movement of the first propelling rod (31);

the movement process of the first pin assembly (4) is as follows: when it is necessary to switch the first pin assembly (4) from the inactive position to the active position, the user needs to press the first pushing piece (32) so that the first limit blocks (33) are butted with the first protruding blocks (44) and the first slide groove (43) is pushed to move towards the first protruding blocks (44), and then the user needs to push the first pushing piece (32) downwards for a certain distance of travel along the first guide groove (102), that is, when the first pushing piece (32) cannot continue moving downwards, and then the user needs to make the first pushing piece (32) move outwards; at the moment, the first limit blocks (33) are separated from the first protruding blocks (44) and the end of the first propelling rod (31) is butted with the end of the corresponding guide block (92) which the end is far away from the second support frame (72);

when it is necessary to switch the first pin assembly (4) from the active position to the inactive position, the user needs to press the first pushing piece (32) to make the first limit block (33) be butted with the first protruding block (44) and push the first slide groove (43) to move towards the first protruding block (44), and then the user needs to push the first pushing piece (32) upwards for a certain distance of travel along the first guide groove (102), that is, when the first pushing piece (32) cannot continue moving upwards, and then the user needs to make the first pushing piece (32) move outwards; at the moment, the first limit blocks (33) are separated from the first protruding blocks (44) and the end of the first push rod (64) is butted with the end of the corresponding guide block (92) which the end is far away from the second support frame (72).

In this embodiment, as shown in FIG. 1, FIG. 2, FIG. 3, FIG. 4, FIG. 5, FIG. 6, FIG. 7, FIG. 11, FIG. 12 and FIG. 13, in order to enable the second pin assembly (6) to better slide relative to the corresponding guide device (9), the second pin assembly (6) comprises a second base (61), two second pins (62) symmetrically arranged relative to the center of the second base (61) and a third pin (63) arranged at the bottom of the housing (2) wherein the two second pins (62) are arranged at the bottom of the second base (61), the third pin (63) is rotatably connected at the bottom of the housing (2), the bottom of the housing (61) is provided with a push rod (64) which pushes the third pin (63) to rotate and the second base (61) is provided with a third slide groove (65) which allows the corresponding guide device (9) to pass through;

the second propelling device (5) comprises a second propelling rod (51) and a second pushing piece (52) wherein the second base (61) is provided with a second protruding block (66), the second propelling rod (51) is connected with the second base (61) in a slidable manner, the second push rod (64) is provided with a fourth slide groove (53) which allows the corresponding guide device (9) to pass through, the second pushing piece (52) is arranged on the lateral of the second propelling rod (51) and protrudes from the outer surface of the housing (2), the housing (2) is provided with a second guide groove (103) which allows the second pushing piece (52) to slide and the width of the second pushing piece (52) is greater than the width of the second guide groove (103). Specifically, the second base (61) is arranged for fixing the two second pins (62); the second pushing piece (52) and the second push rod (64) are arranged so that the second pushing piece (52) can pass on the external force applied by the user to the second propelling rod (51) to make the second propelling rod (51) move horizontally and vertically; the second protruding block (66) is arranged and the side of the second propelling rod (51) far away from the second pushing piece (52) is provided with a notch so that the second propelling device (5) can stop moving and thus limit the horizontal movement of the second propelling rod (51) when the side wall of the notch of the second propelling rod (51) is butted with the second protruding block (66); the third pin (63) and the push rod (64) are arranged so that the push rod (64) can rotate outwards and thus protrude from the outer side of the housing (2) when the push rod (64) moves downwards and contacts the third pin (63);

the movement process of the second pin assembly (6) is as follows: when it is necessary to switch the second pin assembly (6) from the inactive position to the active position, the user needs to press the second pushing piece (52)

so that the second limit block (82) is butted with the second protruding block (66) and pushes the second slide groove (34) to move towards the second protruding block (66), and then the user needs to push the second pushing piece (52) downwards for a certain distance of travel along the second guide groove (103), that is, when the second pushing piece (52) cannot continue moving downwards, and then the user needs to make the second pushing piece (52) move outwards; at the moment, the second limit block (82) is separated from the second protruding block (66) and the end of the second propelling rod (51) is butted with the end of the corresponding guide block (92) which the end is far away from the second support frame (72);

when it is necessary to switch the second pin assembly (6) from the active position to the inactive position, the user needs to press the second pushing piece (52) so that the second limit block (82) is butted with the second protruding block (66) and the second slide groove (34) moves towards the second protruding block (66), and then the user needs to push the second pushing piece (52) upwards for a certain distance of travel along the second guide groove (103), that is, when the second pushing piece (52) cannot continue moving upwards, and then the user needs to make the second pushing piece (52) move outwards; at the moment, the second limit block (82) is separated from the second protruding block (66) and the end of the second push rod (64) is butted with the end of the corresponding guide block (92) which the end is far away from the second support frame (72).

Figure 5:
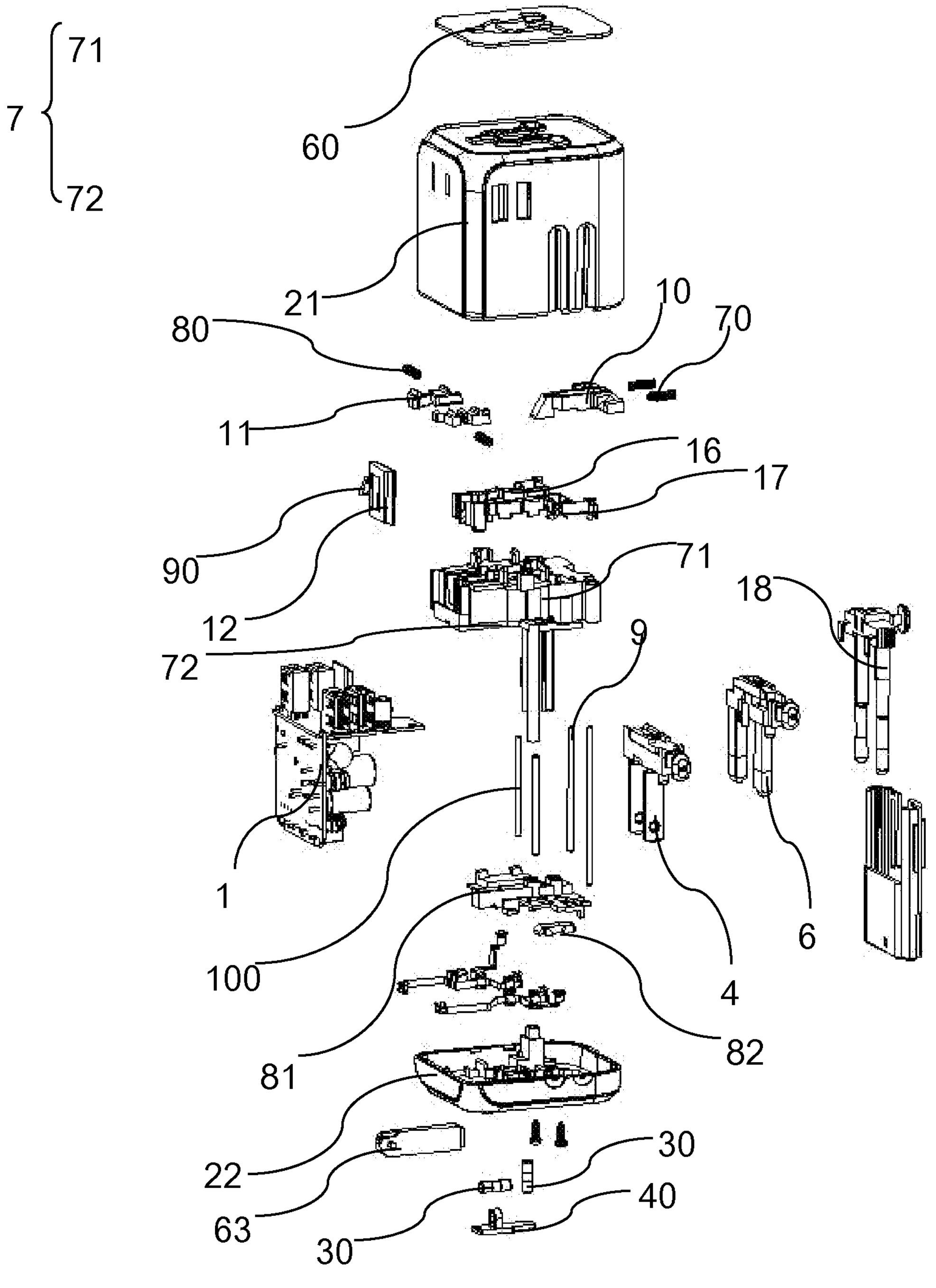
FIG. 5 is an exploded structural view of the plug converter in the present invention.
Figure 15:
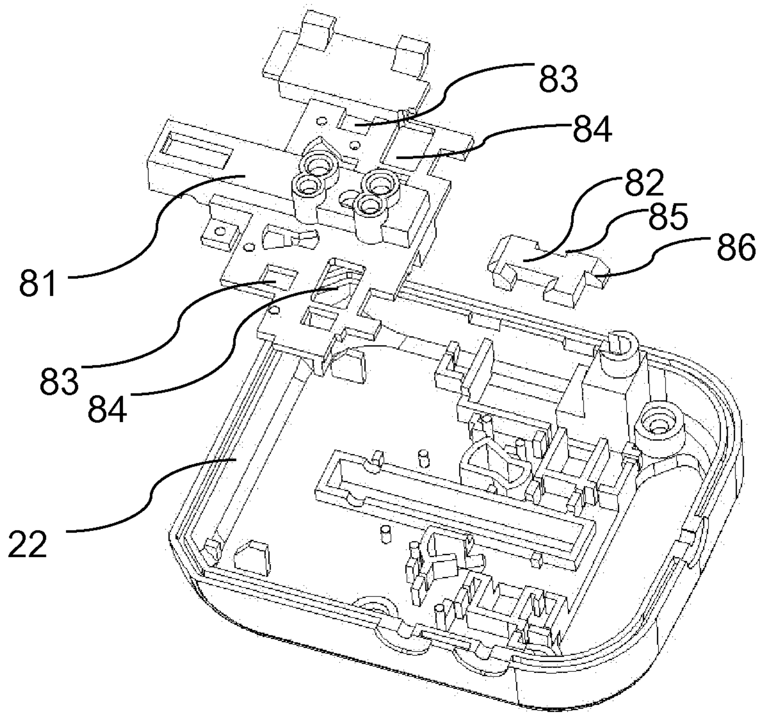
FIG. 15 is a structural view of a limit assembly in the present invention.

In this embodiment, as shown in FIG. 5 and FIG. 15, in order to ensure safe use of electricity, the housing (2) comprises an upper cover (21) and a lower cover (22) which is detachably connected with the upper cover (21) wherein the lower cover (22) is connected with a limit assembly (8) which is used to allow a single pin assembly to protrude from the housing (2); the limit assembly (8) comprises a gland cover (81) and a second limit block (82) wherein the gland cover (81) is provided with two first apertures (83) which allow the first pins (42) to pass through and two second apertures (84) which allow the second pins (62) to pass through;

the top of the second limit block (82) is provided with a first guide slope (85) arranged corresponding to the bottoms of the first pins (42) and a second guide slope (86) arranged corresponding to the bottoms of the second pins (62). Specifically, the gland cover (81) is arranged wherein the connection between the gland cover (81) and the lower cover (22) is detachable, the gland cover (81) and the lower cover (22) can ensure no vertical movement of the second limit block (82) and thus ensure the position limiting effect of the second limit block (82) on the first pins (42) or the second pins (62); charged hardware is connected between the gland cover (81) and the lower cover (22) to facilitate the electrical connection of the first pin assembly (4), the second pin assembly (6) and the third pin assembly (18) with the circuit board (1);

when the first pin assembly moves downwards and contacts the first guide slope (85) of the second limit block (82), the second limit block (82) will move towards the second apertures (84) and the top of the second limit block (82) will move to the position right under the second apertures (84) so that the second limit block (82) can limit the position of the second pins (62); when the second pins (62) move downwards and contact the second guide slope (86) of the second limit block (82), the second limit block (82) will move towards the first apertures (83) and the top of the second limit block (82) will move to the position right under the first apertures (83) so that the second limit block (82) can limit the position of the first pins (42); therefore, the limit assembly (8) in this embodiment makes only the first pin assembly (4) or the second pin assembly (6) protrude from the housing (2) and thus can ensure safe use of electricity.

In this embodiment, as shown in FIG. 5 and FIG. 15, in order to facilitate the rotation of the third pin (63), the third pin (63) is wedged at the bottom of the gland cover (81) and one end of the third pin (63) is rotatably connected with the gland cover (81) via the rotating shaft;

the gland cover (81) is provided with an aperture which allows the push rod (64) to pass through and the third pin (63) is located right under the aperture. Specifically, when the push rod (64) moves and reaches the aperture of the gland cover (81), the push rod (64) will apply a downward force to the third pin (63) and the third pin (63) will protrude from the housing (2) around the rotating shaft.

In this embodiment, as shown in FIG. 5, FIG. 9, FIG. 10, FIG. 12 and FIG. 13, the second support frame (72) is connected with a plurality of conductive rods (100) corresponding to the pin assemblies and the circuit board (1) is electrically connected with the pin assemblies via the corresponding conductive rods (100) to facilitate the electrical connection of the circuit board (1) with the first pin assembly (4) and the second pin assembly (6).

In this embodiment, as shown in FIG. 1, FIG. 2, FIG. 3, FIG. 4, FIG. 5 and FIG. 6, in order to ensure electrical safety of the plug converter in the present invention, the top of the first support frame (71) is connected with a first safety protection door (10) and two second safety protection doors (11) wherein the second safety protection doors (11) are symmetrically arranged relative to the first safety protection door (10), two first resilient elements (70) are connected between the first safety protection door (10) and the inner wall of the housing (2) and two second resilient elements (80) are connected between the second safety protection doors (11) and the first support frame (71);

the lateral of the first support frame (71) is connected with a third safety protection door (12) wherein a third resilient element (90) is connected between the third safety protection door (12) and the lateral wall of the first support frame (71). Specifically, the first safety protection door (10), the second safety protection doors (11) and third safety protection door (12) can prevent a child from electric shock accident caused by the insertion of his or her finger into the housing (2) or the insertion of the user's finger into the housing (2) due to any improper operation; both the first resilient elements (70) and the second resilient elements (80) are springs and the third resilient element is a resilient sheet; certainly, the user can use resilient elements made from other resilient materials because the present invention is without special limitations on the resilient materials;

the top of the housing (2) is provided with eight jacks (20) and one lateral of the housing (2) is provided with two jacks (20) so that the space inside the plug converter can be utilized effectively and the plug converter can made smaller to be carried more conveniently.

Figure 6:
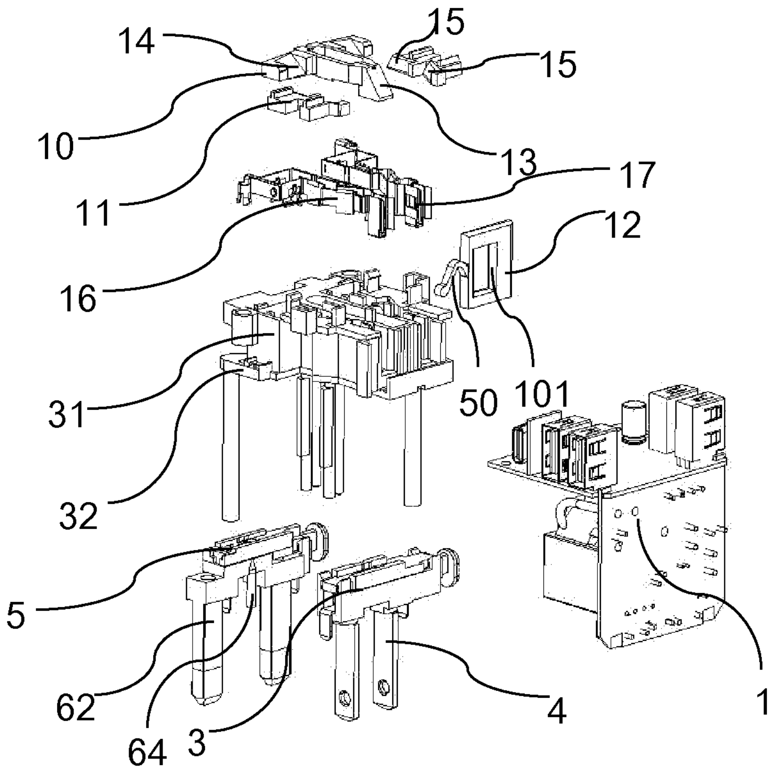
FIG. 6 is a structural view of connecting a support assembly, a first pin assembly, a second pin assembly and a circuit board in the present invention.
Figure 7:
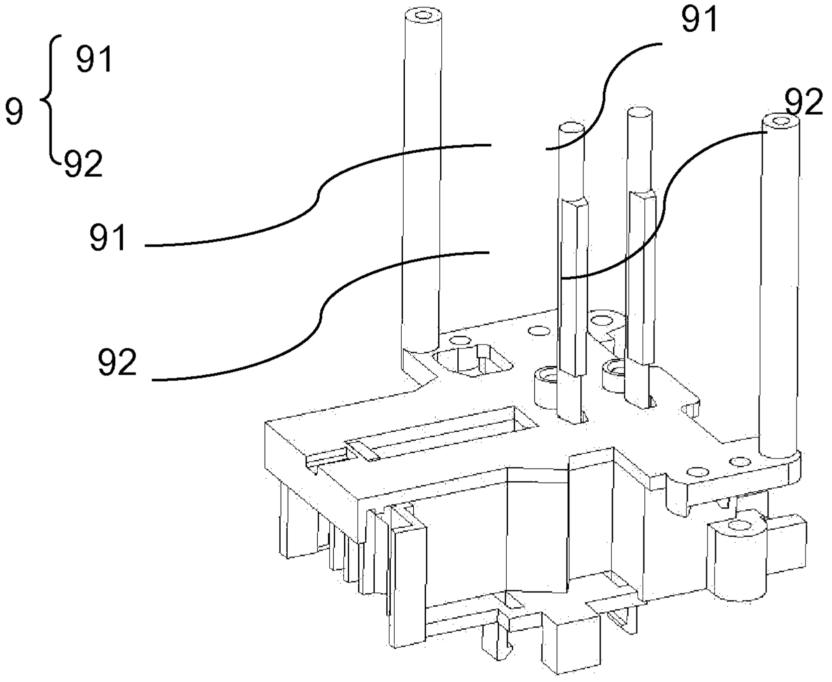
FIG. 7 is a structural view of connecting a guide device and a second support frame in the present invention.
Figure 8:
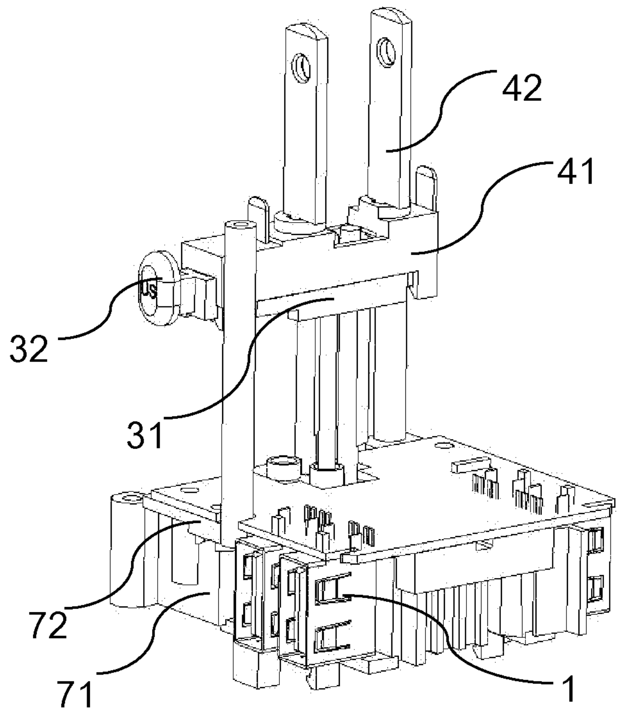
FIG. 8 is a structural view of connecting a first pin assembly and a support assembly in the present invention.
Figure 9:
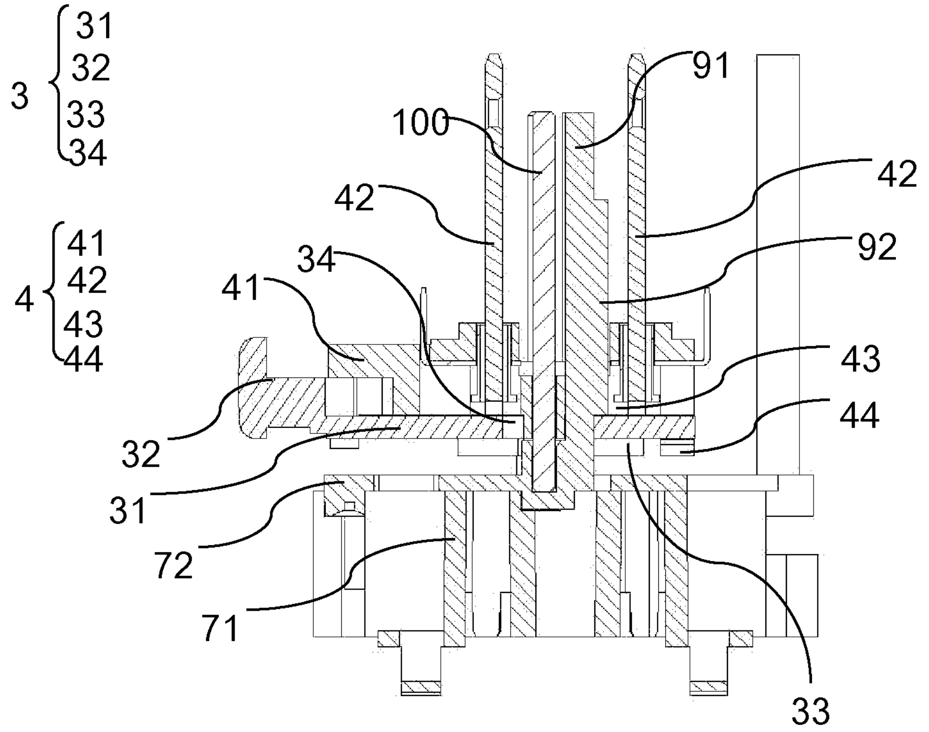
FIG. 9 is a structural view of a first pin assembly in the present invention at the inactive position.
Figure 10:
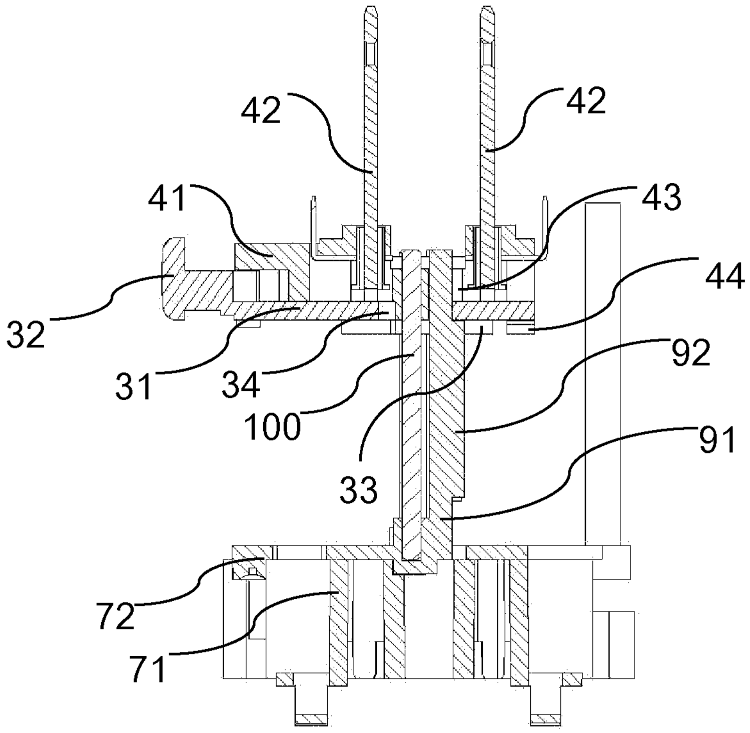
FIG. 10 is a structural view of a first pin assembly in the present invention at the active position.
Figure 11:
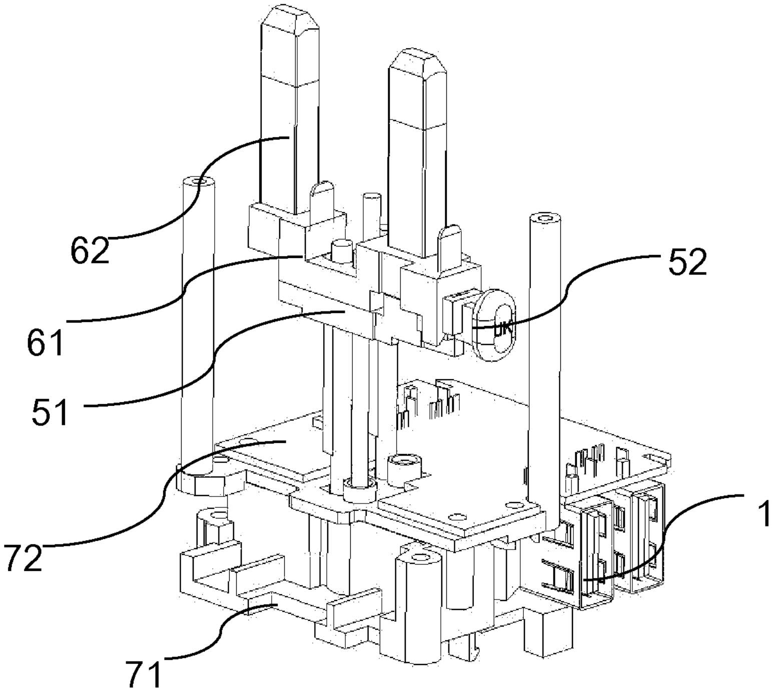
FIG. 11 is a structural view of connecting a second pin assembly and a support assembly in the present invention.
Figure 12:
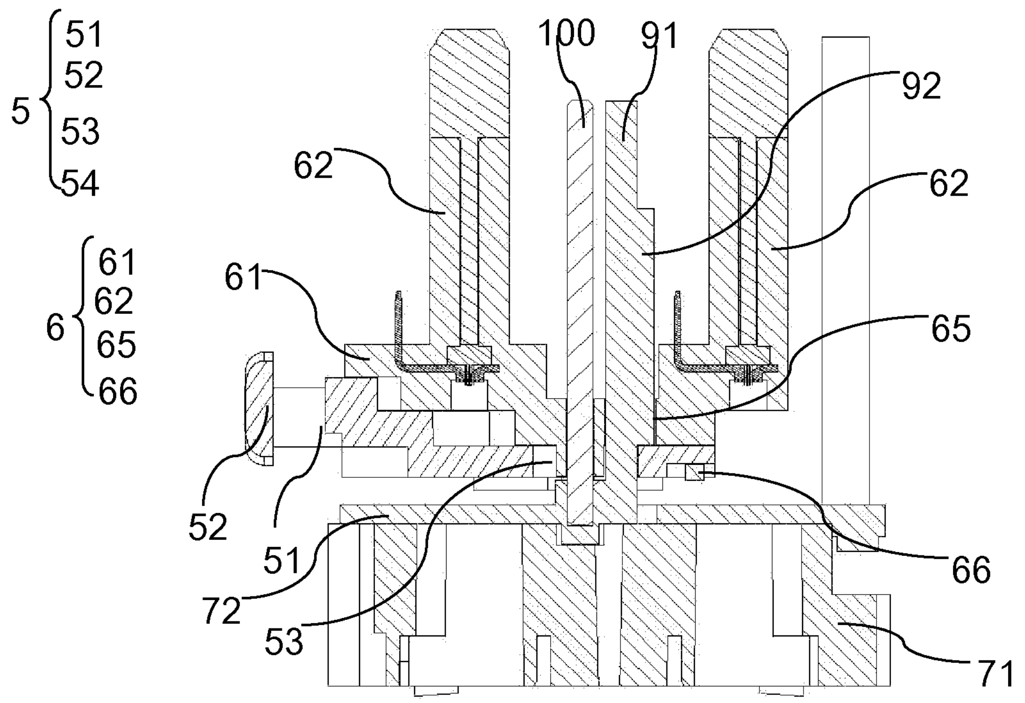
FIG. 12 is a structural view of a second pin assembly in the present invention at the inactive position.
Figure 13:
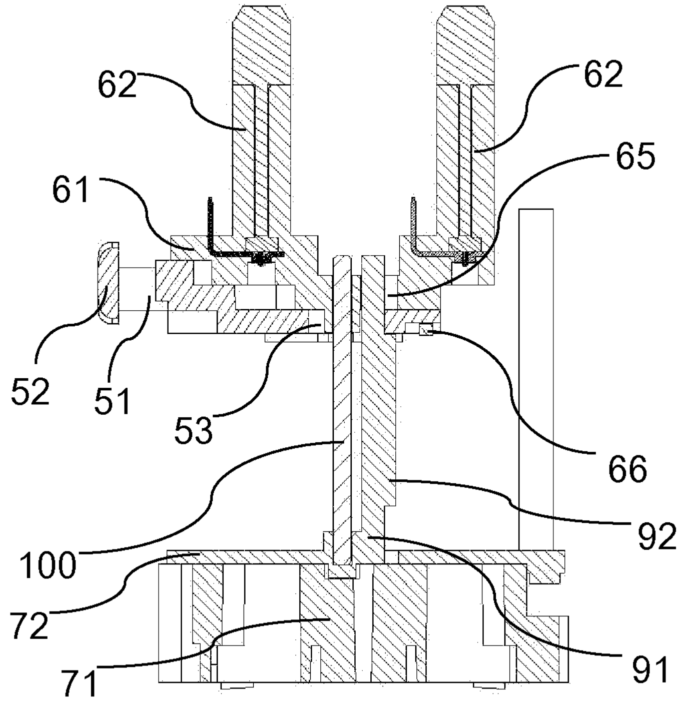
FIG. 13 is a structural view of a second pin assembly in the present invention at the active position.
Figure 14:
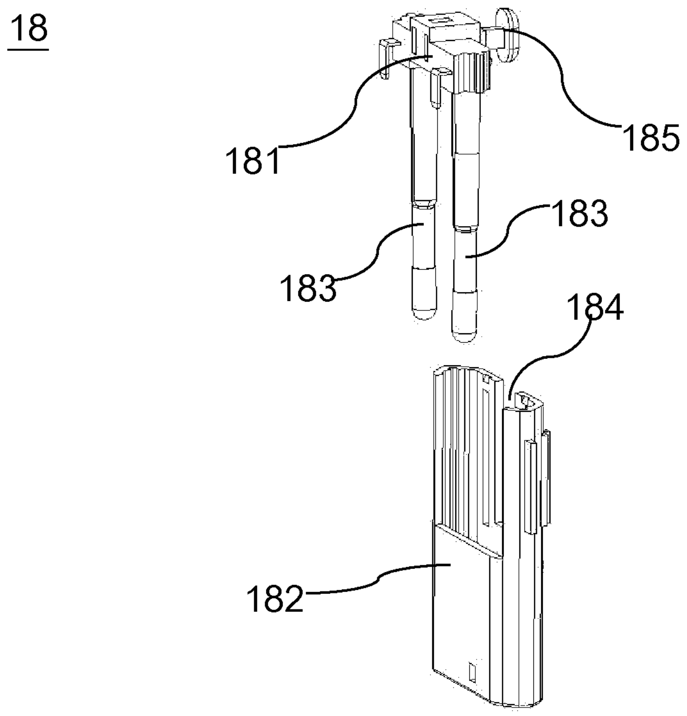
FIG. 14 is a structural view of a third pin assembly in the present invention.

In this embodiment, as shown in FIG. 5 and FIG. 6, one side of the first safety protection door (10) is provided with a third guide slope (13), the other side of the first safety protection door (10) is provided with two fourth guide slopes (14) symmetrically arranged relative to the first guide slope (85) and the two fourth guide slopes (14) are located right above the live-wire connecting sheet (16) and the null-wire connecting sheet (17) respectively wherein the third guide slope (13) and the fourth guide slope (14) guide the external plugs to facilitate the movement of the first safety protection door (10); when an external plug is inserted into the live-wire connecting sheet (16) and the null-wire connecting sheet (17) via the jacks (20) at the top of the housing (2), the first safety protection door (10) will be pushed by the external plug and the first safety protection door (10) will move towards the inner wall of the housing (2) along the top of the first support frame (71) and the first resilient elements (70) will be pushed and pressed and thus insert the external plug; when the external plug is pulled out from the live-wire connecting sheet (16) and the null-wire connecting sheet (17), the external plug will not push the first safety protection door (10) and the first resilient elements (70) will be released and thus return the first safety protection door (10) to the original position;

the second safety protection doors (11) are provided with two fifth guide slopes (15), the fifth guide slopes (15) are arranged opposite to the second resilient elements (80) and the fifth guide slopes (15) are located right above the live-wire connecting sheet (16) or the null-wire connecting sheet (17) wherein the fifth guide slopes (15) guide the external plugs to facilitate the movement of the second safety protection doors (11); when an external plug is inserted into the live-wire connecting sheet (16) and the null-wire connecting sheet (17) via the jacks (20) at the top of the housing (2), the second safety protection doors (11) will be pushed by the external plug and the second safety protection doors (11) will move towards the inner wall of the first support frame (71) along the top of the first support frame (71) and the second resilient elements (80) will be pushed and pressed and thus insert the external plug; when the external plug is pulled out from the live-wire connecting sheet (16) and the null-wire connecting sheet (17), the external plug will not push the second safety protection doors (11) and the second resilient elements (80) will be released and thus return the second safety protection doors (11) to the original position;

the third safety protection door (12) is provided with two sixth guide slopes (101), the sixth guide slopes (101) are arranged opposite to the live-wire connecting sheet (16) and the null-wire connecting sheet (17) wherein the sixth guide slopes (101) guide the external plugs to facilitate the movement of the third safety protection door (12); when an external plug is inserted into the live-wire connecting sheet (16) and the null-wire connecting sheet (17) via the jacks (20) at the top of the housing (2), the third safety protection door (12) will be pushed by the external plug and the third safety protection door (12) will move towards the lateral wall of the first support frame (71) and the third resilient element (90) will be pushed and pressed and thus insert the external plug; when the external plug is pulled out from the live-wire connecting sheet (16) and the null-wire connecting sheet (17), the external plug will not push the third safety protection door (11) and the third resilient element (90) will be released and thus return the third safety protection door (12) to the original position.

In this embodiment, as shown in FIG. 3, FIG. 4, FIG. 5 and FIG. 14, in order to enable the plug converter in the present invention adapt to plugs of different specifications, the plug converter in the present invention also comprises a third pin assembly (18) wherein third pin assembly (18) comprises a third base (181), a support housing (182) and two fourth pins (183) symmetrically arranged relative to the center of the third base (181); the third base (181) is connected with a third pushing piece (185) and the third pushing piece (185) is arranged outside the housing (2), the two fourth pins (183) are arranged at the bottom of the third base (181) and the lateral of the housing (2) is provided with a third guide groove (50) which allows the third pushing piece (185) to slide;

the support housing (182) is provided with two guide apertures, the fourth pins (183) are wedged into the corresponding guide apertures, the support housing (182) is provided with a third slide groove (184) which allows the third base (181) to slide and the height of the third slide groove (184) is smaller than the height of the support housing (182). Specifically, the third pin assembly (18) is an American plug; when it is necessary to switch the third pin assembly (18) from the inactive position to the active position, the user can press the third pushing piece (185) so that the lateral of the third pushing piece (185) is butted with the inner wall of the third base (181) and then the user needs to push the third pushing piece (185) downwards for a certain distance of travel, that is, when the bottom of the third base (181) is butted with the bottom of the slide groove, the third pin assembly (18) can be inserted into an external plug;

when it is necessary to switch the third pin assembly (18) from the active position to the inactive position, the user can press the third pushing piece (185) so that the lateral of the third pushing piece (185) is butted with the inner wall of the third base (181) and then the user needs to push the third pushing piece (185) upwards for a certain distance of travel, that is, when the top of the third base (181) is butted with the upper cover (21), the third pin assembly (18) is fully located inside the housing (2).

In this embodiment, as shown from FIG. 1 to FIG. 4, the circuit board (1) is provided with a plurality of USB interfaces (19) wherein two opposite laterals of the housing (2) are provided with a plurality of jacks (20) corresponding to the USB interfaces (19); two opposite laterals of the circuit board (1) are provided with two USB interfaces (19) and three USB interfaces (19) respectively to effectively utilize the space inside the housing (2) and thus achieve smaller volume of the plug converter and thus enable the plug converter in the present invention to be carried more conveniently.

In this embodiment, as shown in FIG. 5, the upper cover (21) is provided with a cavity wherein the cavity accommodates a group of fuses (30) and the outer side of the cavity is connected with a cover body to facilitate the user's replacement of the fuses and thus improve safe use of the plug converter.

In this embodiment, as shown in FIG. 5, the top of the housing (2) is provided with a decorative sheet to enhance the appearance decoration effect of the plug converter.

To sum up, the plug converter in the present invention is provided with a support assembly (7) comprising a first support frame (71) and a second support frame (72) wherein the first support frame (71) is used for installing the live-wire connecting sheet (16) and the null-wire connecting sheet (17) so that an external plug can be inserted into the live-wire connecting sheet (16) and the null-wire connecting sheet (17) mounted onto the first support frame (71); the second support frame (72) is connected with a plurality of guide devices (9), the housing (2) is connected with a plurality of propelling devices and the pin assemblies slide along the guide devices (9) to the outside of the housing (2) under the propelling effect of the propelling devices to realize the connection of the pin assemblies with external sockets; the bottom of the second support frame (72) is connected with a circuit board (1) to realize the electrification of the live-wire connecting sheet (16), the null-wire connecting sheet (17) and the pin assemblies;

the plug converter in the present invention comprises a support assembly (7) while the circuit board (1), the pin assemblies, the live-wire connecting sheet (16) and the null-wire connecting sheet (17) of the plug converter are arranged on the support assembly (7); therefore, the plug converter in the present invention has the advantages of high internal space utilization rate and high internal part utilization rate; therefore, the volume of the plug converter can be smaller so that the plug converter can be carried more conveniently.

It should be understood that the terms "first", "second" and the like appearing in the present invention are used to describe various information, but the information should not be limited to these terms wherein these terms are merely used to distinguish the information of the same type. For example, without departing from the scope of the present invention, the information described as "first" may also be referred to as the information described as "second", and similarly, the information described as "second" may also be referred to as the information described as "first".

What are described above are only the preferred embodiments of the present invention; it should be pointed out that the ordinary technicians skilled in the technical field can make improvements and modifications without departing from the technical principle of the present invention wherein such improvements and modifications also should belong to the scope claimed by the present invention.

What is claimed is:

1. A plug converter, which is characterized in that the plug converter comprises a housing, a support assembly, a circuit board and at least two pin assemblies wherein the pin assemblies are arranged layer by layer in sequence, and the support assembly comprises a first support frame used for installing a live-wire connecting sheet and a null-wire connecting sheet and a second support frame used for installing the pin assemblies; the first support frame and the circuit board are arranged at the top and the bottom of the second support frame respectively; the housing is connected with a plurality of pin assembly propelling devices; the second support frame is connected with a plurality of guide devices corresponding to the pin assemblies one to one; the pin assemblies are connected with the corresponding guide devices in a slidable manner; the live-wire connecting sheet, the null-wire connecting sheet and the pin assemblies are electrically connected with the circuit board; the top of the housing is provided with a plurality of jacks at the positions corresponding to the live-wire connecting sheet and the null-wire connecting sheet, and the bottom of the housing is provided with a plurality of jacks at the positions corresponding to the pin assemblies;

the propelling devices can drive the corresponding pin assemblies to move between the active position and the inactive position; when a pin assembly is at the active position, the pin assembly is connected with an external socket; when the pin assembly is at an inactive position, the pin assembly is located inside the housing.

2. The plug converter in accordance with claim 1, which is characterized in that a guide device comprises a guide rod and a guide block wherein the guide rod is fixed onto the second support frame and the guide block is arranged on the outer side of the guide rod and protrudes from the guide rod in the radial direction;

when the pin assembly is at the inactive position, the corresponding propelling device is butted with the end of the corresponding guide block wherein the end is adjacent to the second support frame or butted with the lateral of the corresponding guide block; when the pin assembly is at the active position, the corresponding propelling device is butted with the end of the corresponding guide block far away from the second support frame.

3. The plug converter in accordance with claim 2, which is characterized in that the plug converter comprises a first pin assembly, a second pin assembly, a first propelling device and a second propelling device wherein the first pin assembly is connected with the corresponding guide device in a slidable manner and the first propelling device is arranged at the upper end of the first pin assembly;

the second pin assembly is connected with the corresponding guide device in a slidable manner and the second propelling device is arranged at the upper end of the second pin assembly.

4. The plug converter in accordance with claim 3, which is characterized in that the first pin assembly comprises a first base and two first pins symmetrically arranged relative to the center of the first base wherein the two first pins are arranged at the bottom of the first base and the first base is provided with a first slide groove which allow the corresponding guide device to pass through;

a first propelling device comprises a first propelling rod, a first pushing piece and two first limit blocks symmetrically arranged on both sides of the first propelling rod wherein the first base is provided with two first protruding blocks corresponding to the first limit blocks, the first propelling rod is connected with the first base in a slidable manner, the first push rod is provided with a second slide groove which allows the corresponding guide device to pass through, the first pushing piece is arranged on the lateral of the first propelling rod and protrudes from the outer surface of the housing, the housing is provided with a first guide groove which allows the first pushing piece to slide and the width of the first pushing piece is greater than the width of the first guide groove.

5. The plug converter in accordance with claim 3, which is characterized in that the second pin assembly comprises a second base, two second pins symmetrically arranged relative to the center of the second base and a third pin arranged at the bottom of the housing wherein the second pins are arranged at the bottom of the second base, the third pin is rotatably connected with the bottom of the housing and the bottom of the second base is provided with a push rod which drives the third pin to rotate and the second base is provided with a third slide groove which allows the corresponding guide device to pass through;

the second propelling device comprises a second propelling rod and a second pushing piece wherein the second base is provided with a second protruding block, the second propelling rod is connected with the second base in a slidable manner, a second push rod is provided with a fourth slide groove which allows the corresponding guide device to pass through, the second pushing piece is arranged on the lateral of the second propelling rod and protrudes from the outer surface of the housing, the housing is provided with a second guide groove which allows the second pushing piece to slide and the width of the second pushing piece is greater than the width of the second guide groove.

6. The plug converter in accordance with claim 5, which is characterized in that the housing comprises an upper cover and a lower cover which is detachably connected with the upper cover wherein the lower cover is connected with a limit assembly which is used to allow a single pin assembly to protrude from the housing; the limit assembly comprises a gland cover and a second limit block wherein the gland cover is provided with two first apertures which allow the first pins to pass through and two second apertures which allow the second pins to pass through;

the top of the second limit block is provided with a first guide slope arranged corresponding to the bottoms of the first pins and a second guide slope arranged corresponding to the bottoms of the second pins.

7. The plug converter in accordance with claim 6, which is characterized in that the third pin is wedged at the bottom of the gland cover and one end of the third pin is connected with the gland cover through the rotation of the rotating shaft;

the gland cover is provided with an aperture which allows the corresponding push rod to pass through and the third pin is located right under the aperture.

8. The plug converter in accordance with claim 3, which is characterized in that the second support frame is connected with a plurality of conductive rods corresponding to the pin assemblies wherein the circuit board is electrically connected with the pin assemblies via the corresponding conductive rods.

9. The plug converter in accordance with claim 3, which is characterized in that the top of the first support frame is connected with a first safety protection door and two second safety protection doors wherein the two second safety protection doors are symmetrically arranged relative to the first safety protection door, two first resilient elements are connected between the first safety protection door and the inner wall of the housing and two second resilient elements are connected between the second safety protection doors and the first support frame;

the lateral of the first support frame is connected with a third safety protection door wherein a third resilient element is connected between the third safety protection door and the lateral wall of the first support frame.

10. The plug converter in accordance with claim 7, which is characterized in that one side of the first safety protection door is provided with a third guide slope, the other side of the first safety protection door is provided with two fourth guide slopes symmetrically arranged relative to the first guide slope and the two fourth guide slopes are located right above the live-wire connecting sheet and the null-wire connecting sheet respectively;

the second safety protection doors are provided with two fifth guide slopes wherein the fifth guide slopes are arranged opposite to the second resilient element and the fifth guide slopes are located right above the live-wire connecting sheet or the null-wire connecting sheet;

the third safety protection door is provided with two sixth guide slopes wherein the two sixth guide slopes are arranged corresponding to the live-wire connecting sheet and the null-wire connecting sheet respectively.

11. The plug converter in accordance with claim 1, which is characterized in that the plug converter also comprises a third pin assembly wherein the third pin assembly comprises a third base, a support housing and two fourth pins symmetrically arranged relative to the center of the third base; the third base is connected with a third pushing piece and the third pushing piece is arranged on the outer side of the housing, the two fourth pins are arranged at the bottom of the third base and the outer side of the housing is provided with a third guide groove which allows the third pushing piece to slide;

the support housing is provided with two guide apertures wherein the fourth pins are wedged into the corresponding guide apertures, the support housing is provided with a third slide groove which allows the third base to slide and the height of the third slide groove is smaller than the height of the support housing.

12. The plug converter in accordance with claim 1, which is characterized in that the circuit board is provided with a plurality of USB interfaces wherein two opposite laterals of the housing are provided with a plurality of jacks corresponding to the USB interfaces.

13. The plug converter in accordance with claim 8, which is characterized in that the upper cover is provided with a cavity wherein the cavity accommodates a group of fuses and the outside of the cavity is connected with a cover body.

* * * * *